United States Patent
DesJardien et al.

(10) Patent No.: US 9,643,738 B2
(45) Date of Patent: May 9, 2017

(54) LOADING OF AIRCRAFT LANDING GEAR

(71) Applicant: The Boeing Company, Chicago, IL (US)

(72) Inventors: Matthew R. DesJardien, Kenmore, WA (US); Blair P. Nelson, Seattle, WA (US); Allan M. Kremenich, Snohomish, WA (US); Zeyad A. Al Aqrabawi, Tacoma, WA (US); Brian Van Horne, Seattle, WA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 14/714,192

(22) Filed: May 15, 2015

(65) Prior Publication Data

US 2016/0332749 A1    Nov. 17, 2016

(51) Int. Cl.
| | | |
|---|---|---|
| *G06F 7/00* | (2006.01) | |
| *B64F 5/10* | (2017.01) | |
| *G05D 1/00* | (2006.01) | |
| *B64F 5/50* | (2017.01) | |

(52) U.S. Cl.
CPC .................. *B64F 5/10* (2017.01); *B64F 5/50* (2017.01); *G05D 1/00* (2013.01); *G05B 2219/23007* (2013.01)

(58) Field of Classification Search
None
See application file for complete search history.

(56) References Cited

U.S. PATENT DOCUMENTS

| | | | |
|---|---|---|---|
| 6,390,762 B1 | 5/2002 | Peery et al. | |
| 6,485,247 B1 | 11/2002 | Groves et al. | |
| 8,465,247 B2 | 6/2013 | Groves et al. | |
| 2007/0110552 A1 | 5/2007 | Groves et al. | |
| 2010/0119343 A1* | 5/2010 | Groves ................. | B64F 5/0036 414/590 |
| 2013/0056584 A1* | 3/2013 | Dierenfeldt .......... | B64F 5/0045 244/129.4 |

\* cited by examiner

*Primary Examiner* — Yolanda Cumbess
(74) *Attorney, Agent, or Firm* — Miller, Matthias & Hull LLP

(57) ABSTRACT

A method of loading a landing gear in an aircraft comprises accessing an ideal path specifying movement of the landing gear from a starting location to an expected mounting location on the aircraft; determining a difference between the expected mounting location and an actual mounting location on the aircraft; modifying the ideal path to move the expected mounting location to the actual mounting location; and moving the landing gear along the modified path.

17 Claims, 6 Drawing Sheets

LOADING OF AIRCRAFT LANDING GEAR

BACKGROUND

Main landing gears may be installed in an aircraft during or after final body join. Each main landing gear may be mounted to spars or other primary structural members of a wing.

Consider the example of a large commercial jetliner in which each main landing gear weighs tens of thousands of pounds and, when upright, exceeds aircraft working height. Clearances for moving the main landing gear through an opening in the wing's skin, and positioning the main landing gear at a mounting location at a spar, are very tight. If the main landing gear bumps into the skin or spar, it can damage the skin or spar. The damage can be expensive in terms of money and time, especially if production is delayed.

Some aircraft factories have pits for installing main landing gears. An upright landing gear is loaded into the pit, the aircraft is moved over the pit, and the upright landing gear is raised until its load bearing interfaces arrive at their mounting locations.

If a pit is not available, a landing gear loader may be used to position a main landing gear underneath a wing, and translate and tilt the landing gear until its load bearing interfaces arrive at their mounting locations. However, this process involves a series of discrete movements. After each discrete movement, a visual inspection is performed to determine whether there is sufficient clearance. Installation time is prohibitive.

SUMMARY

According to an embodiment herein, a method of loading a landing gear in an aircraft comprises accessing an ideal path specifying movement of the landing gear from a starting location to an expected mounting location on the aircraft; determining a difference between the expected mounting location and an actual mounting location on the aircraft; modifying the ideal path to move the expected mounting location to the actual mounting location; and moving the landing gear along the modified path.

According to another embodiment herein, a system for loading a landing gear in an aircraft comprises a multi-axis loader for rotating and translating the landing gear; and a controller programmed to access an ideal path for commanding the loader to move the landing gear from a starting location and orientation to an ending orientation at an expected mounting location. The controller is further programmed to receive information about an actual mounting location in the aircraft, and modify the ideal path so the loader moves the landing gear from the starting orientation and location to the ending orientation at the actual mounting location instead of the expected mounting location.

These features and functions may be achieved independently in various embodiments or may be combined in other embodiments. Further details of the embodiments can be seen with reference to the following description and drawings.

DETAILED DESCRIPTION

Figure 1:
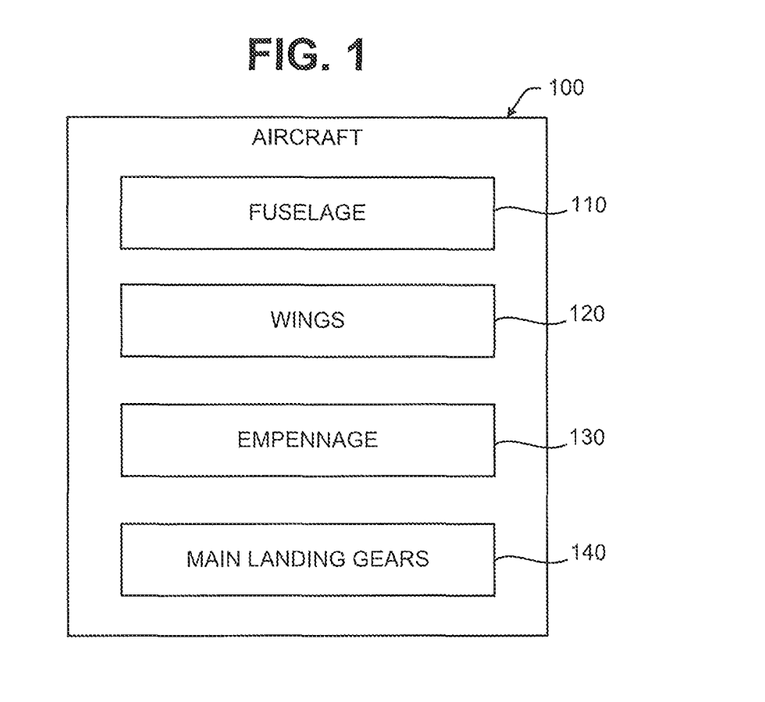
FIG. 1 is an illustration of an aircraft.

Reference is made to FIG. 1, which illustrates an aircraft 100 including a fuselage 110, wings 120, and an empennage 130. The aircraft 100 further includes landing gear, which supports the entire weight of the aircraft 100 during landing and ground operations. The landing gear includes main landing gears 140 attached to spars and and/or other primary structural members of the wings 120. The landing gear may also include a front landing gear attached to a keel of the fuselage 110.

Figure 2:
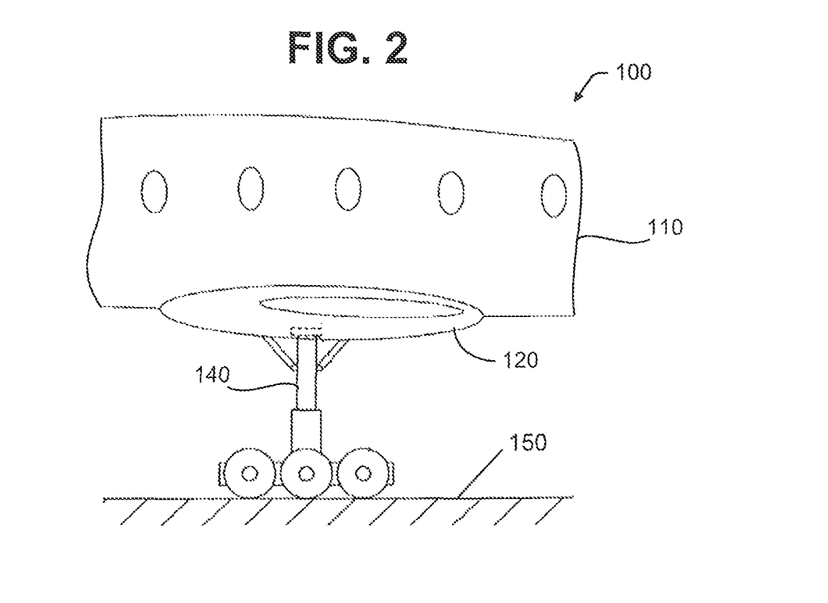
FIG. 2 is an illustration of a main landing gear of an advanced commercial aircraft.

Additional reference is made to FIG. 2 where the aircraft 100 is on a surface 150 that may be a factory floor, runway or other flat surface as discussed below. In an advanced commercial jetliner, each main landing gear 140 may weigh tens of thousands of pounds. When upright, each main landing gear 140 may exceed aircraft working height.

Figure 4A:
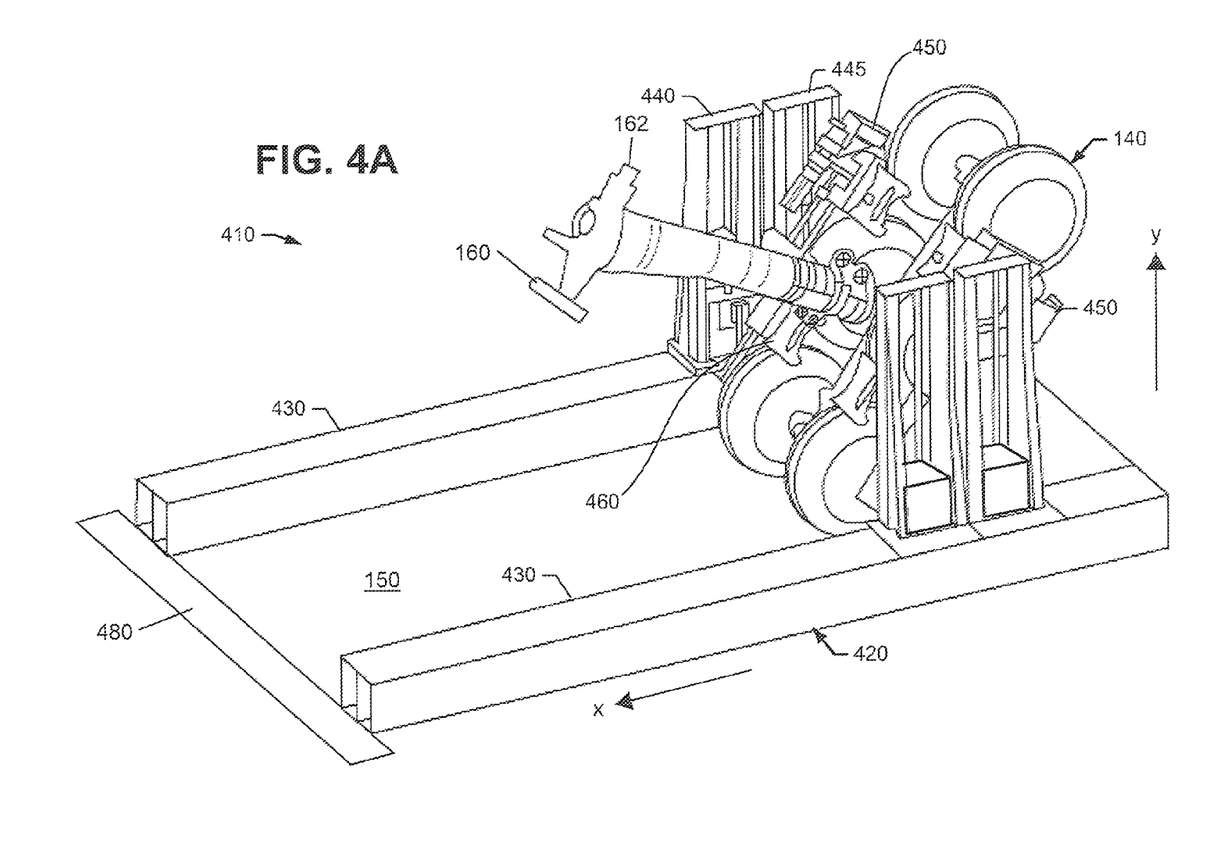
FIGS. 4A-4C are illustrations of a loading system for loading a landing gear in an aircraft.
Figure 4B:
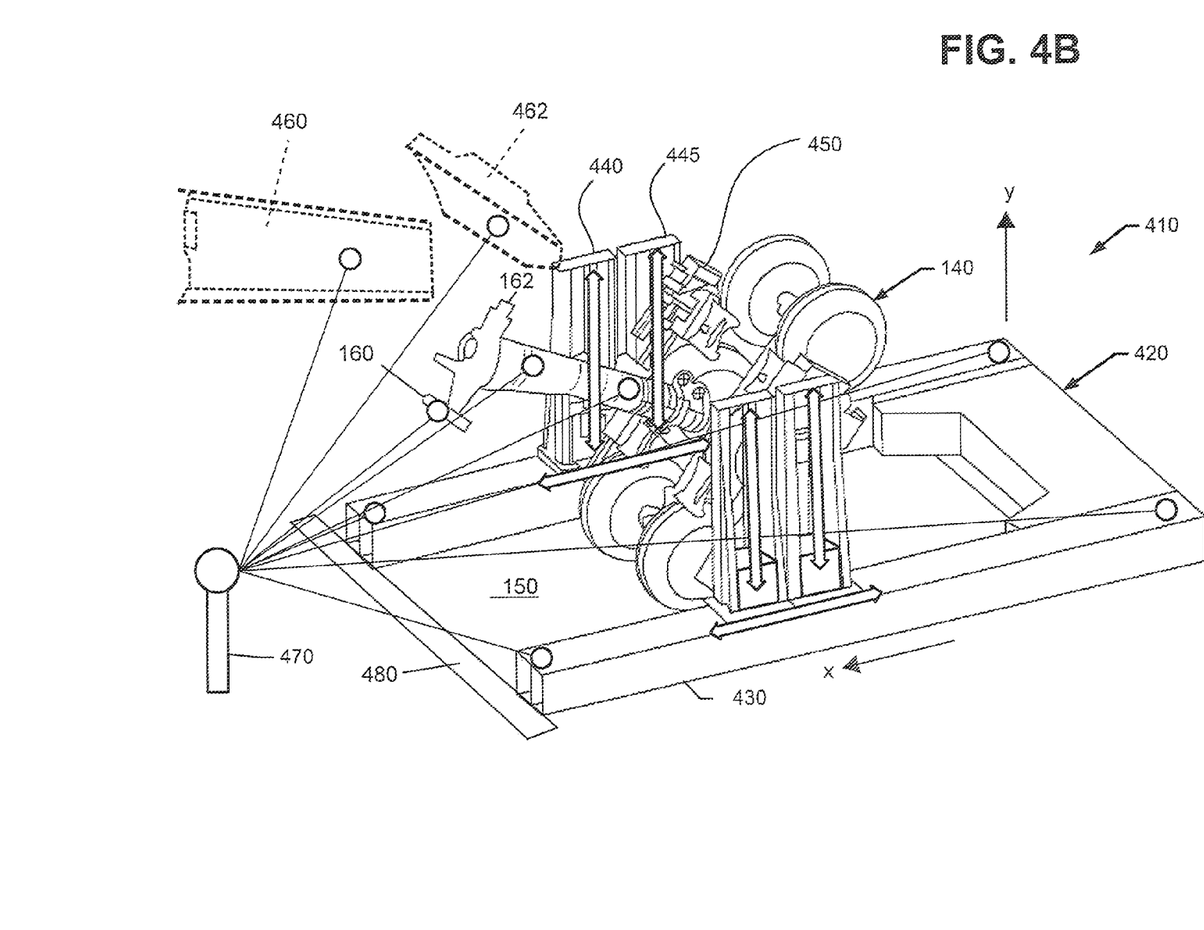
Figure 4C:
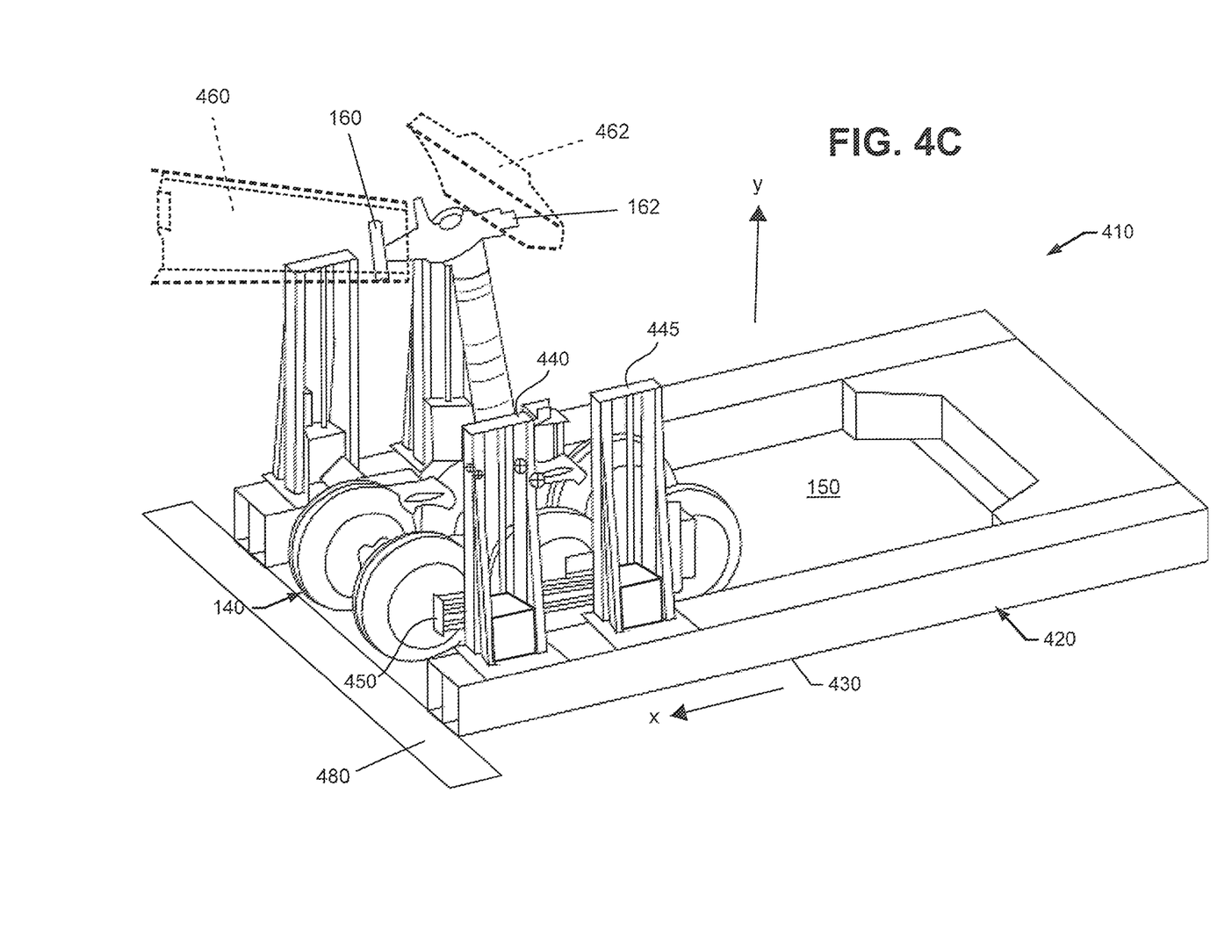

Each main landing gear 140 typically includes struts, fairings, gear actuators, support units, steering systems, and wheel and brake assemblies. Each main landing gear 140 may further include primary load bearing interfaces such as a forward trunion H-block fitting 160 and a rear trunion fitting 162 (FIGS. 4A-4C).

During installation of a main landing gear 140 to a wing 120 the main landing gear 140 is "loaded." The process of loading the main landing gear 140 is to index and affix its load bearing interfaces (e.g., the forward trunion H-block fitting 160 and the rear trunion 162) to mounting locations on primary structural members of the wing 120. For instance, the forward trunion H-block fitting 160 is attached to a rear spar 460 of the wing 120, and the rear trunion 162 is pinned to a landing gear beam 462 (FIGS. 4A-4C). Additional structural and articulation features may be attached after the landing gear 140 is loaded but before it is ready to bear weight.

The main landing gear 140 may be loaded by a multi-axis loader. The multi-axis loader may translate the main landing gear 140 along a primarily forward axis while translating and rotating the main landing gear 140 about other axes.

Figure 3:
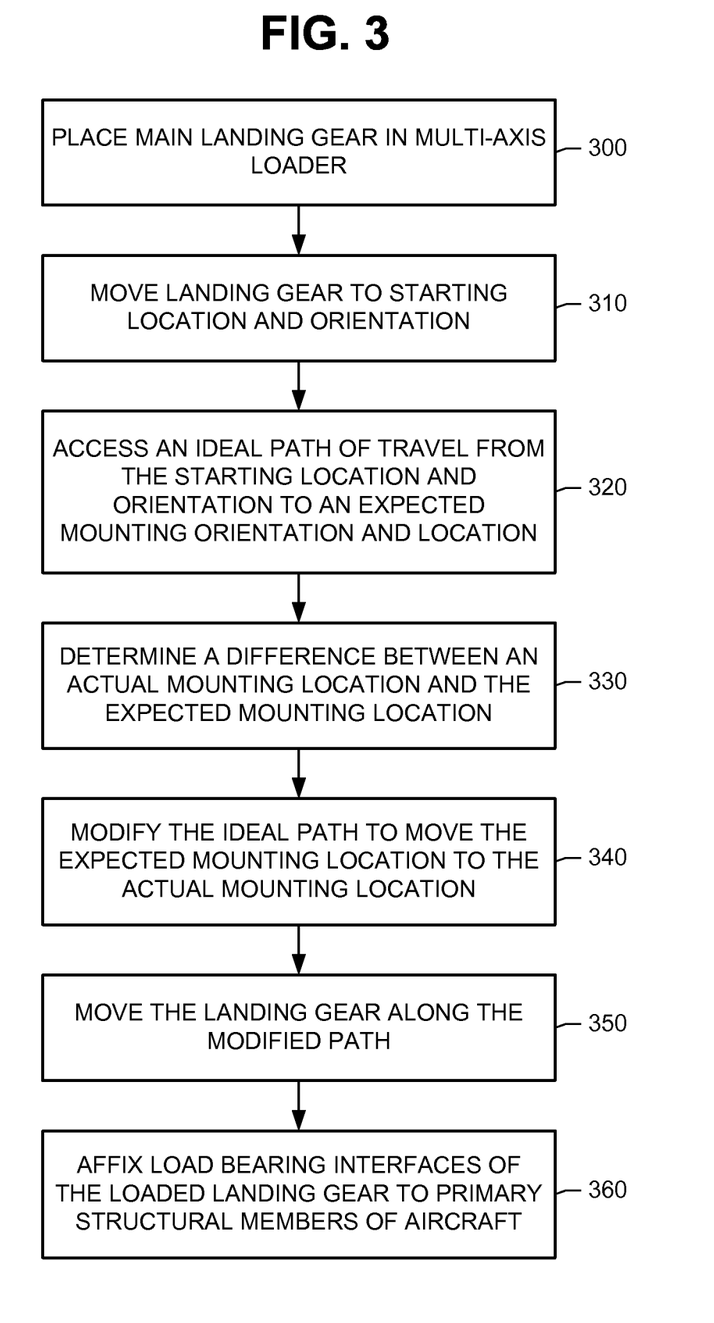
FIG. 3 is an illustration of a method of loading a main landing gear in an aircraft.

Reference is now made to FIG. 3, which illustrates a general method of using the multi-axis loader to load the main landing gear 140 in the aircraft 100. At block 300, the main landing gear 140 is placed in the multi-axis loader. At block 310, the multi-axis loader moves the main landing gear 140 to a starting location and orientation, alongside the aircraft 100. If the method is performed in a factory, the multi-axis loader moves the main landing gear 140 along the floor 150 of the factory.

At block 320, prior to loading, an ideal path is accessed. The ideal path specifies location and orientation of the main landing gear 140 as the multi-axis loader moves it from the starting orientation and location to an expected mounting orientation and location. If the actual mounting location is at its expected location, and if the main landing gear 140 follows the ideal path during loading, then the load bearing surfaces 160, 162 of the main landing gear 140 will arrive at the actual mounting locations on the primary structural members 460, 462 of the aircraft 100. Moreover, if the main landing gear 140 follows the ideal path, and if the actual mounting location is where it is expected, then the main landing gear 140 will arrive without bumping into any portion of the aircraft 100 or any other constraints during loading.

The ideal path may be computer-generated from a simulation based upon computer-aided design (CAD) models of the landing gear 140, and the aircraft 100, and any other constraints (e.g., factory surfaces, surrounding access platforms and other equipment, expected locations of people during loading). The simulation may also produce machine commands that cause the multi-axis loader to move the main landing gear 140 from the starting orientation and location and follow the ideal path to the expected mounting orientation and location. Thus, the ideal path may be represented as coordinates of a local coordinate system, or as machine commands. The coordinate system may be defined by the multi-axis loader.

However, the actual mounting location might not be where it is expected. For instance, there might be positioning errors of the aircraft 100, the landing gear 140 and the multi-axis loader. The factory floor 150 might be uneven or not level.

At block 330, a difference between the actual mounting location and the expected mounting location on the aircraft 100 is determined. After the difference has been determined, the aircraft 100 is not allowed to move until the landing gear 140 has been loaded. Although FIG. 3 shows block 320 occurring before block 330, a method herein is not so limited. The difference may be determined before, during or after the ideal path is accessed.

At block 340, the ideal path is modified to move the expected mounting location to the actual mounting location. As a first example, any position errors are treated as an offset of the expected mounting location, and the ideal path is modified to correct the offset. As a second example, mathematical methods are used to compensate from axes of the ideal path to the loader's functional axes. If the loader is parked with its forward axis 0.5 degrees off from a forward axis of the ideal path, the x and y components of the ideal path are modified to be in the correct relation to the aircraft 100.

At block 350, the multi-axis loader moves the landing gear 140 along the modified path. The landing gear 140 is moved from its starting orientation and location to the actual orientation and location. As the landing gear 140 is moved, its load bearing interfaces 160, 162 fit through an opening in lower skin of the aircraft 100 and are positioned at the actual mounting location on a primary structural member 460, 462, all without bumping into any portion of the aircraft 100 or any other constraints.

As the landing gear 140 is being loaded, its actual location and orientation may be tracked. For instance, a scanning system may track discrete points on the landing gear during loading. Knowledge of the actual location and orientation may be used to improve the accuracy of loading the landing gear 140. For instance, the tracked points may be compared to the modified path, and loader commands may be adjusted to reduce error between the modified path and the actual orientation and location of the landing gear 140.

At block 360, load bearing interfaces 160, 162 of the main landing gear 140 are affixed to primary structural members 460, 462 of the aircraft 100. As the main landing gear 140 is being affixed, the loader continues to support the main landing gear 140. The load bearing interfaces 160, 162 are typically large bore, tight tolerance interfaces. The multi-axis loader may also have a functionality to allow a mechanic to "bump" the main landing gear 140 relative to the primary structural members 460, 462. The bumping creates very small movement to allow tight bore pins to fit.

In the method of FIG. 3, the expected mounting orientation is not necessarily upright. For instance, the main landing gear 140 may be loaded in a stowed or partially stowed orientation.

The method of FIG. 3 may be used to install the main landing gear 140 in a factory during or after final body join. However, the method is not so limited. The method of FIG. 3 may be performed on an aircraft outside of a factory. As but one example, main landing gear 140 of an aircraft 100 may be replaced while the aircraft 100 is on a runway or other flat surface 150 of an airport. In this example, the aircraft 100 is supported while the main landing gear140 is removed from the aircraft 100. The multi-axis loader may be used to "walk" the main landing gear 140 out of position. The ideal path would be the same, but performed backwards, to avoid collisions upon exit. After the main landing gear 140 has been removed, the multi-axis loader moves replacement main landing gear 140 to a starting location and orientation, and loads the replacement main landing gear 140 according to blocks 320 to 360.

Reference is made to FIGS. 4A-4C, which illustrate an example of a loading system 410 for loading the landing gear 140 according to the method of FIG. 3. The loading system 410 includes a multi-axis loader 420. The multi-axis loader 420 includes first and second linear rails 430 that are straight and parallel to each other. The linear rails 430 define forward functional x-axes. The linear rails 430 are intended to provide a straight path alongside the aircraft 100.

The linear rails 430 may be configured for mobility. For example, wheels, air bearings or castors may be mounted underneath the linear rails 430.

The multi-axis loader 420 further includes a first pair of first and second loading towers 440 and 445 for the first linear rail 430, and a second pair of first and second loading towers 440 and 445 for the second linear rail 430. Each loading tower 440 and 445 of each pair is independently movable along its linear rail 430. Linear motion along the linear rails 430 may be achieved with machine screw components (e.g., roller screw, ball screw, or acme screw), a rack and pinion type system (e.g., roller rack, belt system, or traditional sliding friction point), an electromagnetic linear motor, a pressured cylinder system (hydraulic or pneumatic), or other linear drive system.

The multi-axis loader 420 further includes a first beam 450 mounted to the first pair of loading towers 440 and 445, and a second beam 450 mounted to the second pair of loading towers 440 and 445 (one of the beams 450 is shown most clearly in FIG. 4C). Each loading tower of each pair is mounted to its corresponding beam 450 at a mounting point. Each mounting point is linearly and independently movable along its corresponding loading tower 440 or 445 in a vertical y-axis. Linear motion may be achieved with machine screw components, a rack and pinion type system, an electromagnetic linear motor, a pressured cylinder system, or other linear drive system.

When the main landing gear 140 is placed in the multi-axis loader 420, there is a beam 450 on each side of the main landing gear 140. The main landing gear 140 is mounted to the beams 450, for example, by pinching tires of the main landing gear 140 from above and below with wheel chalks 460.

Through independent movement of the loading towers 440 and 445 along the linear rails 430, and through independent movement of the mounting points along the loading towers 440 and 445, the main landing gear 140 may be translated and tilted with respect to multiple axes.

The ideal path may be determined with respect to a local coordinate system of the multi-axis loader. The linear rails 430 define x-axes of the coordinate system, and the loading towers 440 and 445 define y-axes of the coordinate system.

FIG. 4A shows the multi-axis loader 420 with the main landing gear 140 in the starting location and orientation. The main landing gear 140 is retracted and tilted.

FIG. 4B shows the main landing gear 140 being walked under a wing 120 (the spar 460 and landing gear beam 462 of the wing 20 are shown in phantom). Each pair of loading towers 440 and 445 is slid together along the linear rails 430 in a forward direction.

FIG. 4C shows the landing gear 140 at the end of the modified path, after having been walked under the aircraft 100. The first loading towers 440 are moved ahead of the second loading towers 445, causing the main landing gear 140 to tilt into an upright position. The forward trunion H-block fitting 160 of the main landing gear 140 is now in position to be attached to the rear wing spar 460, and the rear trunion 162 is now in position to be pinned to the landing gear beam 462.

At all times, the front wheels of the landing gear 140 are on the floor 150 so as to support some of the weight of the landing gear 140. After the main landing gear 140 has been tilted to the upright position, all of its wheels are on the floor 150.

Operation of the multi-axis loader 420 may be controlled by a controller (not shown). The controller accesses commands for the linear drive systems of the multi-axis loader 420, modifies the commands to account for a difference between the expected and actual mounting locations, and sends the modified commands to the linear drive systems to move the main landing gear 140 along the modified path. The controller may be mounted to the multi-axis loader 420 to form a cohesive whole. Alternatively the controller may be implemented as part of a higher level cell-controller.

The loading system 410 may further include a metrology system 470 (shown in FIG. 4B), such as radar, laser tracker or vision-based motion capture. The metrology system 470 can measure the distance to specific points (e.g., features) on the actual mounting locations on the rear spar 460 and landing beam 462. Examples of these specific points may include landing gear mounting points, tooling balls on the loader, side of body fittings, assembly pin locations, retroreflective monuments, and surface-mounted photogrammetric targets. The metrology system 470 can also measure the distance to specific points on the linear rails 430 of the multi-axis loader 420. The metrology system 470 may also measure the distance to specific points on the main landing gear 140 as the main landing gear 140 is being loaded. Given this information, the controller can determine the difference between the expected and actual mounting locations.

Figure 5:
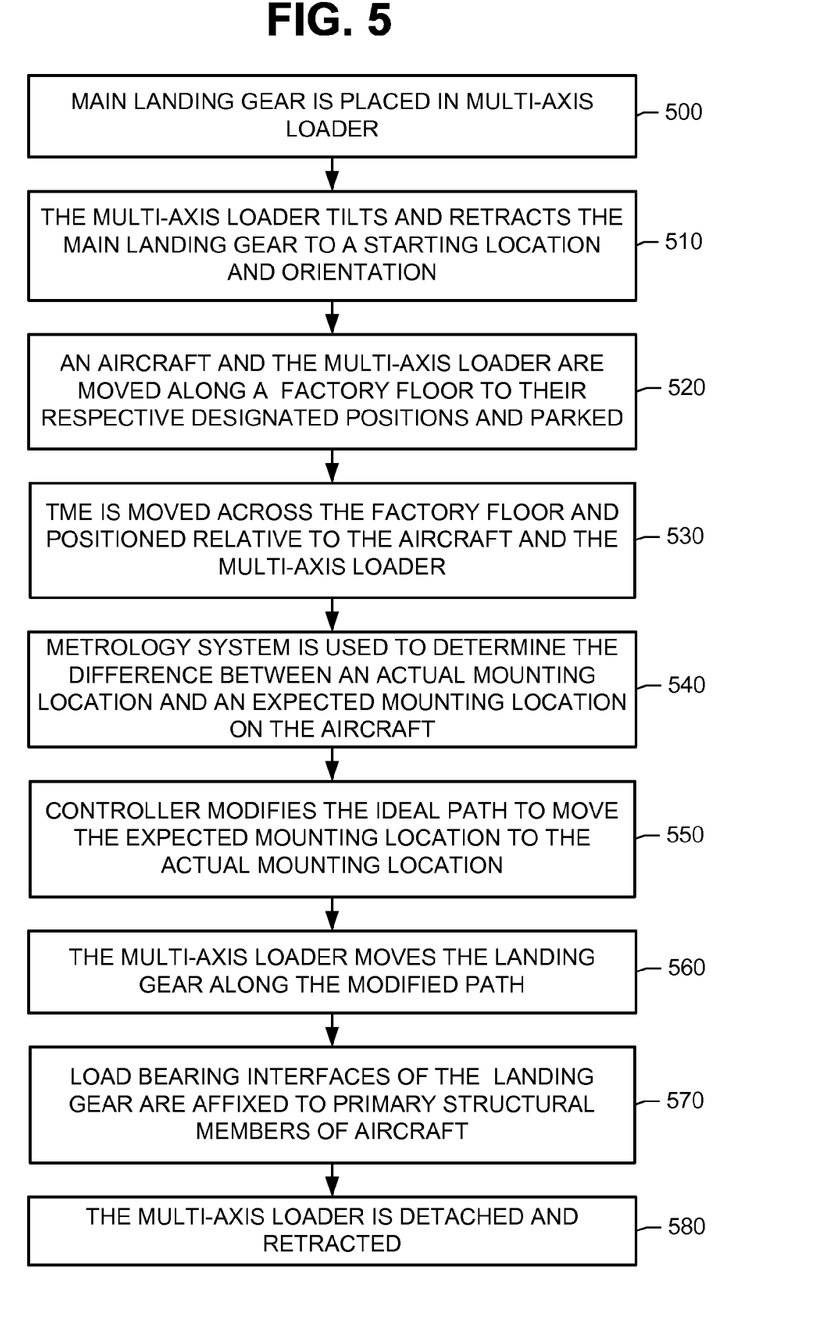
FIG. 5 is an illustration of a method of loading a landing gear in an aircraft in a factory.

Reference is now made to FIG. 5, which illustrates a method of using the loading system 410 in a factory to load main landing gear 140 in an aircraft 100. The factory has a floor 150 that is relatively flat. The factory floor 150 may have indexing marks for positioning the aircraft 100. For example, the indexing marks may include paint stripes for indicating the position of the aircraft 100 on the factory floor 150.

The factory floor 150 may also have having indexing 480 for positioning the multi-axis loader 420 relative to the aircraft 100. As a first example, indexing pins (not shown) may protrude from the factory floor 150. As a second example, paint stripes 480 (FIGS. 4A-4C) on the factory floor 150 indicate the position of the multi-axis loader 420.

At block 500, the main landing gear 140 is placed in the multi-axis loader 420. For instance, the landing gear 140 may be placed in the multi-axis loader 420 by an overhead crane or forklift.

At block 510, the multi-axis loader 420 retracts and tilts the main landing gear 140 to its starting location and orientation.

At block 520, the aircraft 100 and the multi-axis loader 420 are moved along the factory floor 150 to their respective designated positions and parked. The multi-axis loader 420 may be moved across the factory floor 150 by means such as an omni-directional crawler or a tug. If the factory floor 150 has indexing pins, the linear rails 430 of the multi-axis loader 420 may engage the indexing pins to establish a precise location on the factory floor 150. The multi-axis loader 420 is now dimensionally stable, and its linear rails 430 will not be moved until the method has been completed. The aircraft 100 may be parked prior to parking the multi-axis loader 420, or the multi-axis loader 420 may be parked prior to parking the aircraft 100.

At block 530, scaffolding, stands, and other temporary movable equipment (TME) are moved across the factory floor 150 and positioned relative to the aircraft 100 and the multi-axis loader 420. TME such as scaffolding and stands may be used to fasten the landing gear 140 to the aircraft 100 and attach additional structural and articulation features after the landing gear 140 has been loaded but before it is ready to bear weight. The TME may also be used to perform or complete a wing-to-fuselage join.

At block 540, the metrology system 470 is used to determine the difference between actual mounting locations and expected mounting locations on the aircraft 100. The difference is supplied to the controller. If the actual mounting locations are obscured by aircraft skin, tooling may be indexed to the actual mounting locations. The tooling may serve as a proxy to give points with lines of sight.

At block 550, the controller modifies the ideal path to move the expected mounting locations to the actual mounting locations. At block 560, the controller commands the multi-axis loader 420 to move the landing gear 140 to follow the modified path.

At block 570, load bearing interfaces 160, 162 of the main landing gear 140 are affixed to primary structural members 460, 462 of the aircraft 100. The multi-axis loader may hold the main landing gear 140 in place while the load bearing interfaces 160, 162 are being affixed.

At block 580, the multi-axis loader 420 is detached from the main landing gear 140. For instance, the wheel chalks 460 may be removed. The multi-axis loader 420 is then retracted.

Thus, the main landing gear 140 is loaded above grade at current aircraft working height without having to raise the aircraft 100. A series of discrete movements of the main landing gear 140 is eliminated during loading. As a result, loading time is reduced significantly.

The method of FIG. 5 eliminates the need for pits and other fixed structures on a factory floor 150. This, in turn, minimizes impact to the rest of the factory. It also enables floor space to be reconfigurable. This flexibility allows for a production line to be adjusted and optimized. Work can be balanced across multiple cells, and the location of each work cell may be shifted, by a couple feet or by a full airplane length.

The floor area for installing the landing gear may be shared with several labor intensive activities, including side of body join, fuselage joins, and aircraft equipment fitting. Having the loading accurately staged ahead of time allows the landing gear to be loaded without a risk of collision and with increased ergonomic access.

The method of FIG. 5 is not limited to main landing gear 140. For instance, the method of FIG. 5 may be applied to front landing gear.

The methods and system above are not even limited to landing gear. For instance, the multi-axis loader may be used to install objects such as boat propellers, motors, and munitions.

The invention claimed is:

1. A method of loading a landing gear in an aircraft, the method comprising:
 accessing an ideal path specifying movement of the landing gear from a starting location at which the landing gear is not installed on the aircraft to an expected mounting location on the aircraft where the landing gear will be affixed to the aircraft;
 determining a difference between the expected mounting location and an actual mounting location on the aircraft;
 modifying the ideal path to move the expected mounting location to the actual mounting location;
 moving the landing gear along the modified path; and
 loading the landing gear onto the aircraft at the actual mounting location.

2. The method of claim 1, wherein the landing gear is loaded above grade at current aircraft working height.

3. The method of claim 1, wherein the landing gear is moved continuously along the modified path.

4. The method of claim 1, wherein the landing gear is loaded outside of a factory.

5. The method of claim 1, wherein the aircraft includes primary structural members and the landing gear includes load bearing interfaces; and wherein moving the landing gear includes translating the landing gear along a primarily forward axis while translating and tilting the landing gear about other axes to walk the landing gear underneath the primary structural members until the load bearing interfaces are positioned at mounting locations of the primary structural members.

6. The method of claim 5, wherein the landing gear is a main landing gear; and wherein a wing of the aircraft includes the primary structural members.

7. The method of claim 1, wherein a metrology system is used to determine the difference between the expected mounting location and the actual mounting location.

8. The method of claim 1, wherein a multi-axis loader is used to move the landing gear along the modified path during loading, the ideal path determined with respect to a local coordinate system of the multi-axis loader.

9. The method of claim 8, wherein the multi-axis loader includes first and second linear rails that extend along x-axes of the local coordinate system; a first pair of towers moved along the first linear rail; and a second pair of towers movable along the second linear rail; wherein each tower is mounted to the landing gear at a mounting point; and wherein each mounting point is independently moved along y-axes of the local coordinate system.

10. The method of claim 9, wherein the multi-axis loader is moved across a factory floor and parked at indexed positions on the factory floor, and wherein the aircraft is moved to a designated position on the factory floor.

11. A system for loading aircraft landing gear in an aircraft, the system comprising:
 a multi-axis loader for rotating and translating the landing gear; and
 a controller programmed to access an ideal path for commanding the loader to move the landing gear from a starting location and orientation at which the landing gear is not installed on the aircraft to an ending orientation at an expected mounting location where the landing gear will be affixed to the aircraft; receive information about an actual mounting location in the aircraft; modify the ideal path so the loader moves the landing gear from the starting orientation and location to the ending orientation at the actual mounting location instead of the expected mounting location, and loading the landing gear onto the aircraft at the actual mounting location.

12. The system of claim 11, wherein the controller is programmed to command the multi-axis loader to move the landing gear continuously along the modified path.

13. The system of claim 11, further comprising a metrology system for determining a difference between the actual and expected mounting locations of the landing gear; wherein the controller is programmed to use the difference to modify the ideal path.

14. The system of claim 11, wherein the multi-axis loader includes first and second linear rails; a first pair of loading towers movable along the first linear rail; and a second pair of loading towers movable along the second linear rail; wherein each loading tower is mounted to the landing gear.

15. The system of claim 14, further comprising a first beam mounted to the first pair of loading towers; a second beam mounted to the second pair of loading towers; and aircraft landing gear clamped to the first and second beams.

16. The system of claim 14, wherein the loading towers are independently movable along the linear rails and independently controllable in a vertical direction.

17. The system of claim 16, wherein the linear rails define x-axes of a coordinate system of the multi-axis loader and the loading towers define y-axes of the coordinate system; and wherein the ideal path is determined with respect to the coordinate system.

* * * * *